(12) United States Patent
Ortiz Cicuendez

(10) Patent No.: US 12,250,906 B2
(45) Date of Patent: Mar. 18, 2025

(54) MULTIPURPOSE MACHINE FOR CULTIVATING TREES

(71) Applicant: IANUS INGENIERIA, S.L.U., Ciudad Real (ES)

(72) Inventor: Jose Ortiz Cicuendez, Ciudad Real (ES)

(73) Assignee: IANUS INGENIERIA, S.L.U., Pedro Munoz (ES)

( * ) Notice: Subject to any disclaimer, the term of this patent is extended or adjusted under 35 U.S.C. 154(b) by 637 days.

(21) Appl. No.: 17/560,345

(22) Filed: Dec. 23, 2021

(65) Prior Publication Data

US 2022/0225570 A1 Jul. 21, 2022

(30) Foreign Application Priority Data

Jan. 21, 2021 (ES) .............................. ES202130093U

(51) Int. Cl.
*A01D 46/00* (2006.01)
*A01D 46/30* (2006.01)
*B25J 9/00* (2006.01)
*B25J 19/00* (2006.01)

(52) U.S. Cl.
CPC ............ *A01D 46/30* (2013.01); *B25J 9/0009* (2013.01); *B25J 19/0008* (2013.01); *B25J 19/0091* (2013.01)

(58) Field of Classification Search
CPC ........ A01D 46/00; A01D 46/28; A01D 46/30; A01G 3/0408; A01G 3/0435; B25J 9/0009; B25J 19/0008; B25J 19/0091; B62D 49/06; B62D 49/07
See application file for complete search history.

(56) References Cited

U.S. PATENT DOCUMENTS

| 3,473,310 | A | | 10/1969 | Christianson | |
| 4,683,969 | A | * | 8/1987 | Littau | A01B 51/026 |
| | | | | | 56/214 |
| 5,074,107 | A | | 12/1991 | Windemuller | |
| 5,092,422 | A | * | 3/1992 | Hood, Jr. | B62D 49/0607 |
| | | | | | 172/306 |
| 9,578,868 | B2 | * | 2/2017 | Jones | A01C 23/047 |
| 11,203,120 | B1 | * | 12/2021 | Hill | B25J 9/0087 |
| 2020/0215865 | A1 | * | 7/2020 | Sirault | B62D 51/04 |
| 2021/0245821 | A1 | * | 8/2021 | Crouzat | B62D 49/0607 |

FOREIGN PATENT DOCUMENTS

| ES | 1047154 U | 3/2001 |
| ES | 2630833 | 8/2017 |
| ES | 2652322 | 2/2018 |

* cited by examiner

*Primary Examiner* — Thomas B Will
*Assistant Examiner* — Robert E Pezzuto
(74) *Attorney, Agent, or Firm* — ASLAN LAW, P.C.

(57) ABSTRACT

A multipurpose machine for cultivating trees, comprising an inverted U-shape structure that enables the machine to pass over existing trees to carry out pruning, disinfection or fruit picking tasks, provided at the bottom with wheels, driven by at least one motor that autonomously facilitates the movement thereof, and respective upper frames that telescopically couple to each other, being driven by respective cylinders to move the portion of the structure on the right with respect to the one on the left in order to vary the width of the machine. Likewise, the machine has the ability to raise or lower the upper structure of the same to adapt it to the height of the trees to be cultivated.

10 Claims, 5 Drawing Sheets

Fig. 3
Fig. 4
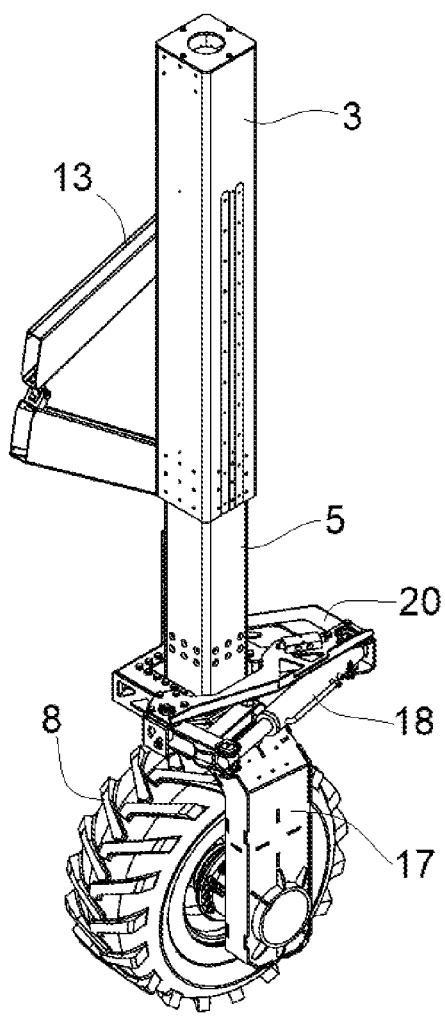
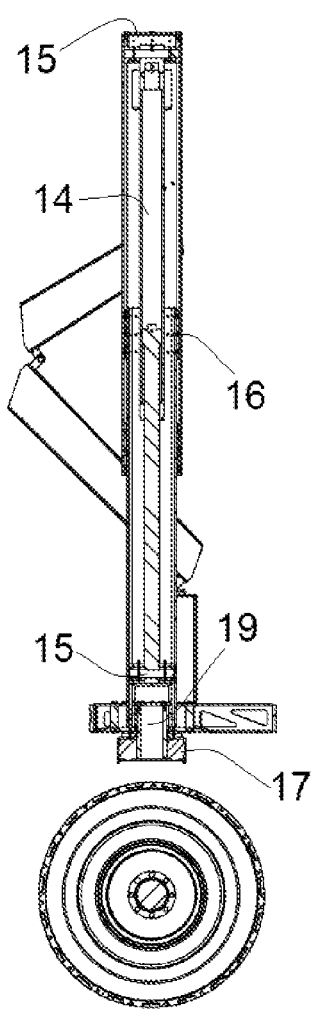

MULTIPURPOSE MACHINE FOR CULTIVATING TREES

CROSS-REFERENCE TO RELATED APPLICATIONS

This application claims priority to Spain (ES) Patent Application No. U202130093 filed on Jan. 21, 2021, the entire contents of which are hereby incorporated by reference.

TECHNICAL FIELD

The invention falls within the field of manufacturing land vehicles, specifically self-propelled agricultural machines, intended for cultivating trees and fruit trees, incorporating different tools for pruning, fumigation or picking any type of fruit on the tree.

Specifically, the object of the invention is a new type of agricultural machine with an extendable gantry for cultivating trees and fruit trees. A new mobile machine is proposed, built with a telescopic structure, both horizontally and vertically, from structural tubes, with which it can be adjusted to the dimensions of the tree and be able to move by way of a gantry between the fruit trees and bushes.

By means of the new invention, all kinds of tasks can be tackled for cultivating trees such as almond, pistachio, walnut, olive trees, or fruit trees such as orange, apple, lemon trees, in general all kinds of trees with heights and canopy diameters between 1 and 5 m.

BACKGROUND OF THE INVENTION

Trees and fruit trees are usually cultivated with conventional tractors, which work in the centre of the tramlines and carry out pruning and fumigation work, but laterally, they are not capable of going over the bushes. On many occasions, when the trees have certain dimensions, in order to successfully carry out pruning or fumigation work, several passes through the same row are required, and normally, the interior of the tree and the crowns are not worked in a simple manner.

As for the harvesting of the fruit of these bushes, it is normally done manually, using conventional techniques. To pick olives, almonds or pistachios, among others, blankets are spread on the ground and the trees are vibrated. For the picking of fruit trees such as the orange or lemon tree, it is normally done manually for the top quality fruit and then the trees are also vibrated so that they fall into blankets or umbrella-like mechanical vibration equipment. Sometimes, harvesting is also carried out using adapted self-propelled harvesting machines, but only in those cases where the trees are small (Super-intensive cultivation). Once the trees grow above maximum levels, there are no machines on the market capable of encompassing a large tree and able to vibrate the trunk or branches thereof to obtain its fruit, nor prune it, nor treat it with pesticides.

Document ES1047154U describes a tree fruit harvesting machine, which includes a structure mounted on wheels, which carries a tree vibrator, which presents a structure made up of two parallel vertical gantries, which are attached by the lower end of the lateral branches thereof by means of two frames that run inside said branches, between each two branches on the same side, and are longitudinally separated by a distance greater than the thickness of the tree trunks. Document ES2630833, by the same inventor, has envisaged that the transversal parallel gantries are made up of a set of four segments, successively hinged to each other at pivot points, of which two end segments constitute fixed vertical uprights emerging from each respective lateral frame, and the two intermediate segments are hinged with the vertical uprights at hinge points, and with each other in an intermediate hinged position.

Document ES2652322 describes a machine that includes a frame formed by gantries associated with lateral structures, externally provided with platforms and wheels that are adjustable in height, among which it is possible to include hoppers for collecting the fruits. This is a multipurpose machine, since the hopper has a practicable character, including a phytosanitary treatment system as well as a pruning system and vibrating/shaking means for the fall of the corresponding fruit, the latter being also able to be coupled and uncoupled depending on the needs of each moment.

Documents U.S. Pat. Nos. 3,473,310 and 5,074,107 teach fruit harvesting machines having an inverted U-shaped frame that straddles a row of trees or bushes; which is equipped with wheels and a guide connected to the frame to engage the tree and direct the movement thereof. A product collector, a vibrator and a product collection hopper are mounted inside said frame.

In the state of the art, no references have been found to a tractor-like machine focused on cultivating trees, with a telescopic structure both horizontally and vertically, which can be adjusted to the dimensions of the tree and be able to move by way of a gantry between the fruit trees and bushes, being able to tackle all kinds of cultivation tasks of the same, at the same time that it can be driven on public roads, since when it is retracted it does not exceed the legal maximum dimensions.

It would also be desirable for an agricultural machine, in addition to being multipurpose and consequently capable of being used in various tree cultivation tasks, to have independent drive and steering in all 4 wheels, so that it had full mobility around a tree or around a row of trees.

DESCRIPTION OF THE INVENTION

The machine described in the invention is formed by a structure of telescopic tubes, which is capable of adjusting to the specific measurements of the tree to be cultivated. It is a self-propelled machine that has the particular feature of, for the transport thereof, being able to adopt conventional measures that enable the transit thereof on a public road in accordance with international standards, and once in the cultivation, extend horizontally and vertically to be able to access the trees from above and from both sides.

Apart from having the ability to drive on public roads without exceeding the legal maximum levels, this extendable machine can be transported in a gondola without a pilot car since the dimensions thereof are less than 3 metres wide and 3.8 metres high.

This machine, equipped with various accessories, is capable of carrying out the main tasks for cultivating trees and bushes, generally fruit or nut-producing trees; for example:

Tree pruning: Incorporating a series of blades or pruning systems throughout the arch thereof, so that it is able to prune tree branches and prepare the buds for the next season.

Tree pruning and treatment: Since this tractor has a high load and traction capacity, pruning and treatment accessories can be installed at the same time. After pruning the tree, a disinfectant treatment is applied to the cuts to heal the plant; both processes being contained in the same self-supporting structure of the telescopic tractor.

Application of phytosanitary products: In this case, a series of fumigation nozzles and a motor-pump unit with a tank of phytosanitary products must be incorporated into the arch of the machine in order to apply it to the tree from all angles, generating a curtain or cloud of disinfectant liquids to be able to carry out the treatments in every season of the year. At the same time that the trees can be treated, it is also possible to carry out the simultaneous treatment of the soil with herbicides incorporating a tank and fumigation pipes.

Fruit picking: By means of a vibration device for trees, the machine of the invention is capable of vibrating the trunk of the tree at a certain range and frequency, thus the fruit falls onto conveyor belts to take it to a hopper that incorporates a continuous discharge arm. It is also possible to incorporate a vibration system for branches with an oscillating system for those fruits such as olives that require a great vibration for the picking thereof.

The invention is built from two frames made of large structural tubes welded in the shape of a U and facing and coupled to each other that, when moving closer and moving away, reduce or expand the width of the machine. Vertically, the structure of the machine also presents an inverted U configuration in order to leave the complete central free arch with which it can move over large trees. One of the most relevant features of the machine described is its capacity for vertical and horizontal opening. Initially, for road transport, or even for field work in small trees, it maintains approved measurements with a maximum width of 3 metres and a height of 3.8 metres.

Both the vertical and the horizontal extension of the machine structure is carried out from double-acting cylinders located inside each of the frame supports. When these cylinders are driven, the telescopic bodies in which the cylinders are anchored slide and the machine is able to lift and laterally open 1.5 metres more than the maximum road transport measurements. These telescopic tubes are guided by friction plates.

This machine has two independent hydraulic circuits, one of them is responsible for the transmission. For this purpose it has 4 drive wheels that are also steering wheels to be able to turn in the smallest possible space. By means of this hydraulic system the mobility and opening of the machine is carried out. The other hydraulic system is responsible for supplying power for use to the accessory that is incorporated into the tractor, depending on the task to be carried out, pruning, fumigation or picking.

When the machine travels on the road, the cabin is located in the central portion of the frame, and the motor and all accessories are contained within a maximum width of 2950 mm. Once the machine reaches the work field, from connecting rods located in the lower portion of the cabin, the cabin is moved to the left, as well as the motor, and there is a free arch through which the machine can pass, leaving the trees inside the arch or gantry.

Next, the main components that make up this agricultural machine with an extendable gantry for cultivating trees will be set forth:

1. Telescopic Structure for Vertical Opening of the Gantry:

The machine has 4 independent height-adjustable supports that can be operated to raise the entire frame assembly. This lifting is carried out hydraulically by means of a double-acting cylinder. In this case, the rear portion of the cylinder is attached to an outer tube and the cylinder head is attached to a tube with a smaller diameter than the previous one. There are friction plates between both tubes that enable the longitudinal movement between the male and female structural tubes, preventing premature wear of the frame.

2. Telescopic Structure for Lateral Opening of the Gantry:

As with the vertical lifting of the structure, the invention also incorporates a lateral opening mechanism. This action is carried out in a similar manner to the previous one, inside the structure, a smaller cross section tube is incorporated with a double-acting hydraulic cylinder that performs the controlled effort of horizontal movement of the gantry.

To be able to perform the lateral opening, the machine must follow an automated sequence: Advancing a few metres with the right wheels rotated in a favourable position and, as it advances, the cylinders expand by means of a program dictated by a main automaton. For the lateral closure of the machine, the wheels will rotate in the opposite direction and when the machine moves forward, the cylinders will retract.

In all types of opening, both lateral and vertical, the aspect ratio must be correct to prevent tipping. From the electronic screen and the main automaton, these data are entered and, automatically, the machine interprets the position thereof and safely performs the opening.

3. Internal Movement of Cabin and Motor:

In road mode, the machine of the invention complies with the maximum height and width limits according to international traffic regulations. In order to maximise the internal arch of the machine in work mode, both the motor and the cabin must be moved.

When the machine is driving on a public road, the cabin will be located at the front, in a central position. In this case, the motor will also remain within the usable work surface. Once the machine reaches the cultivation and the work mode is selected, using a hydraulic mechanism, the cabin will move to the left and the motor will also move, leaving the maximum working surface in the inverted U shape.

4. Motor and Hydraulics System for Movement and Components:

The whole machine is driven by a single diesel motor of sufficient power in which a set of hydraulic pumps has been installed. These pumps provide the oil pressure and flow rate required for the two main hydraulic systems.

From this hydraulic energy, the hydraulic motors of each of the wheels are started and hydraulic power is also supplied to the rotation cylinders, machine lifting and the other actuators to be able to drive the accessories that are installed in the machine.

The new multipurpose machine for cultivating trees incorporates two independent hydraulic systems. On the one hand, a hydraulic system made up of a tank, pumps and the motors of the wheels to be able to give traction to the machine. In this system, several braking and compensation valves are also incorporated so that the traction of the machine is correct. There is also an electronic or mechanical control in the cabin to regulate the direction and speed of travel.

On the other hand, there is another independent system that incorporates other pumps, oil tanks and distributors, with which hydraulic power is provided to the steering of the wheels, to the vertical and lateral lifting cylinders of the machine and to the external systems that are incorporated therein.

5. Drive Wheels and Steering Wheels:

The agricultural machine of the present invention has 4 wheels of specific size and features. Each of them is driven by a hydraulic motor to ensure traction on any surface. In road mode, the front or rear shaft can be activated or deactivated to increase the efficiency of the machine, but in work mode the machine must fully traction, to ensure safe and efficient use.

These hydraulic wheel motors are driven by a system made up of a diesel motor and one or more hydraulic pumps that generate high oil pressure in a closed circuit. The hydraulic fluid is stored in a reservoir; thus, to prevent the system from overheating and breaking down, the total flow is filtered and cooled in coolers located in the upper portion.

Two of these four wheels incorporate a negative hydraulic brake, which always remains activated and deactivates when there is oil pressure in the transmission line.

The aforementioned four drive wheels are also steering wheels. The rotation of the wheels is carried out from the stroke of a hydraulic cylinder and two internal bushings (axial and radial) that enable the wheel structure to rotate independently from the machine structure.

The machine can turn its four wheels or block the rotation of one of the two shafts thereof. When the machine is in road mode, it can only turn with the front wheels, since the dimensions are normal and the turns can be easily made. However, when the machine is in the field, open with a large aspect ratio, space for turns is critical and for this reason, the rear wheels also include steering. In this way, the machine is capable of practically turning on itself to be able to manoeuvre like a current tractor, thus preventing the lack of practicality inherent to a larger wingspan.

These turns are electronically controlled, since it is not possible to install a conventional steering kinematics as in conventional tractors. In this equipment, a typical parallelism mechanism would not be compatible since the machine does not have fixed dimensions in an inverted U shape, but rather it contracts and lengthens, requiring the wheels of the same shaft to lose parallelism during the opening/closing of the machine. By means of the automaton, the machine is able to calculate these rotations and coordinate the position of the cylinders so that each wheel can perform the rotation correctly, maintaining the necessary parallelism both in a straight path and in a curve.

6. Wheel-Independent Hydraulic Suspension and Automatic Levelling of the Structure:

One of the main features of this extendable machine is its ability to absorb uneven ground in the longitudinal and transversal axis. To this end, each of the machine's wheel supports has a lifting cylinder. Once in working position, these cylinders adopt the damping function and each wheel arm can contract or extend to absorb uneven ground. Due to this damping, it is ensured that all the wheels are always in contact with the ground, preventing loss of traction in the machine. For this reason, the machine is capable of absorbing a maximum slope of the ground of 38%.

The machine has a system of slope sensors so that the frame opening operation is safe. If in light of an eventuality, the machine leans above the safety value, these cylinders perform the levelling quickly and automatically.

7. Guiding of Hoses and Wiring:

Given the telescopic nature in two shafts, the guiding of piping and cables is a critical point. A series of hoses and wiring must reach the motors of each wheel of the machine, as well as the cabin. The rest of the actuators and sensors must also be able to receive the precise signals and fluids for the operation thereof.

Thus, this point has been resolved using scissor-shaped parts through which all wiring and hoses have been guided, such that as the machine unfolds, these hinged scissors open and the hoses are not damaged. These parts have been included in the four supports of the machine (vertical elevation) and in the lateral opening portion.

8. Other Components:

The diesel tanks have been included in the lower portion of the structure of the upper frames, in order to achieve a front surface that is as small as possible.

The oil tanks have been incorporated into the internal portion of the structural tubes in order to save space and favour a positive column of hydraulic oil to the lower pumps to prevent the cavitation thereof. Thus, the front projection of the machine is the minimum admissible.

The hydraulic distributors for rotation, lifting, opening and other auxiliary drives are located on the upper portion of the machine. The oil starts from the previous tanks and descends by gravity to the pumps. They pump the oil with the required pressure and flow rate to the distributors and these direct the hydraulic force towards each component depending on whether the automaton opens or closes the distributor channel, in a modulated manner. The oil then flows to a set of coolers, is cooled and subsequently returns to the tank.

The distributors of the different accessories that can be incorporated into the machine are also located in this upper portion.

The electrical panels and the main automaton of the machine are also located in this upper position. This upper structure has been built so that it is light and ventilated, it is prepared to be accessed in light of any hydraulic or electronic eventuality.

9. Pruning, Fumigation or Picking Accessory Support:

Guiding plates have been installed on the four supports of the machine that support structural nodes, which can be lifted or lowered by means of a hydraulic spindle and motor. These mobile nodes are completely independent from each other and are the supports for the accessories to be installed.

In this manner, the position of the accessories to be installed is completely independent from the position of the gantry. The structure can be fully lifted, but the accessories could raise or lower independently depending on the position of the tree.

In each of these nodes, the pruning, fumigation or fruit picking systems are anchored by means of anchoring screws and centring devices. These accessories are installed using both electrical and hydraulic quick connections to be able to quickly change work accessories.

By means of this new invention, work times in the field will be reduced since, with a single pass in the rows of trees, fumigating, pruning or picking are enabled. Currently, several passes have to be carried out, such as during fumigation or pruning to finish the task. Even on occasion, due to the large dimensions of the trees, the work is not carried out correctly.

DESCRIPTION OF THE FIGURES

As a complement to the description provided herein, and for the purpose of helping to make the features of the invention more readily understandable, the present specification is accompanied by a set of drawings which, by way of illustration and not limitation, represent the following:

FIG. 3 shows in detail one of the vertical telescopic supports (3) of the machine, which is formed by the main tube and the telescopic tube (5). This figure also shows the supports (13) (e.g., a hinge) for guiding wiring and hoses and the cylinder (18) that enables the wheels (8) of the machine to rotate.

Likewise, FIG. 4 shows a cross-sectional cut of the previous vertical support (3) in which the cylinder (14) that performs the lifting or lowering of the machine is indicated, the fixed supports (15) of the fastenings of the cylinder (14), the friction plates (16) of both telescopic tubes and the friction bushings (19) that enable the wheels (8) to rotate.

PREFERRED EMBODIMENT OF THE INVENTION

Figure 1:
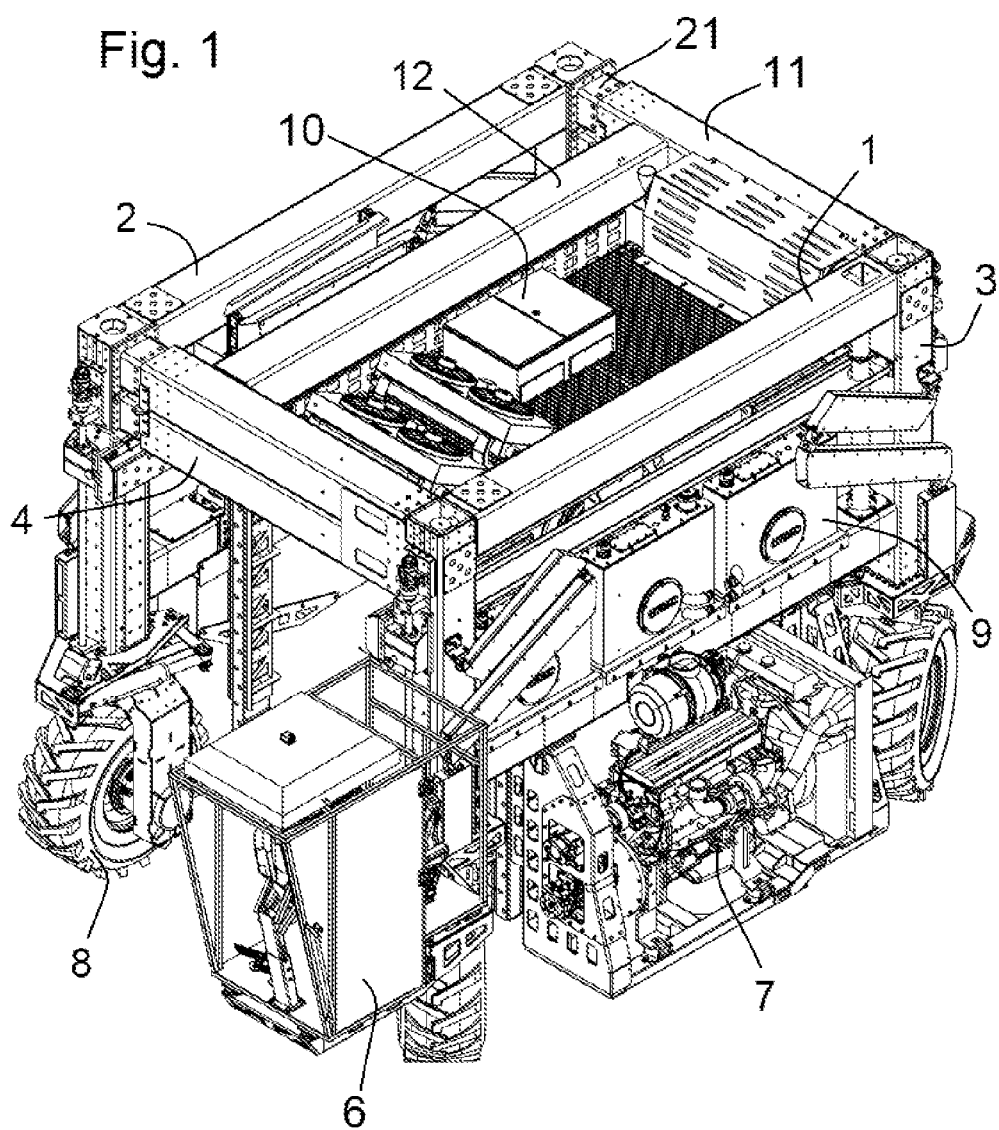
FIGS. 1 and 2 show two views of the extendable telescopic machine. In the first one it is in a closed position and in the second the telescopic vertical and horizontal supports are open. These figures show the opening and lifting capacity of the new machine described in order to be able to move over the trees and bushes to be worked.

As can be seen in the figures, the machine of the invention is made up of a welded tube structure with an inverted U shape, such that it can pass over the existing trees or fruit trees, to be able to carry out pruning, disinfection or fruit picking tasks. To move autonomously, said machine is provided at the bottom with wheels (8), driven by a hydraulic system.

The structure of the machine is vertically divided into two frames (1, 2) that are telescopically coupled to each other, such that they equip the machine with adjusting means for adjusting the width thereof and thus be able to adopt a narrow position in which the machine presents a width that is less than the maximum allowed by international legislation and that therefore can circulate on public roads without the need for a special permit. When scaled up to a dimension approaching twice the narrow position, the machine is able to pass outside the trees without touching them, so that only the accessories thereof can have access thereto to perform the intended tasks.

To this end, a first upper frame (1) with a U-shape configuration, the core of which makes up one of the longitudinal sides thereof, while the wings (11) thereof shape up the front and rear sides of said structure, said wings (11) being formed by tubes that are open at the free end and attached at points close to the ends thereof by a structural crossbar (3).

As can be seen in the figures, the wings (11, 21) that form the front and rear sides of the structure of the machine are double and consequently have thereunder other wings (22, 23) welded to the previous ones, which in turn incorporate therein a hydraulic cylinder that collaborates in the telescopic movement of the portion of the structure on the right with respect to the one on the left, varying the width of the machine.

The second upper frame (2) also has a U-shaped configuration, which is facing that of the first frame (1), so that the core thereof makes up the other longitudinal side, while its wings (21) telescopically couple inside the wings (11) of the first frame (1).

Inside the respective facing wings (11, 21), respective hydraulic cylinders (24) are installed at the ends (25) of said wings, with the driving of which moves the portion of the structure on the right is telescopically with respect to that on the left, varying the width of the machine. The friction plates (26) located between both telescopic wings (11, 21) enable a smooth and precise sliding between them.

Figure 2:
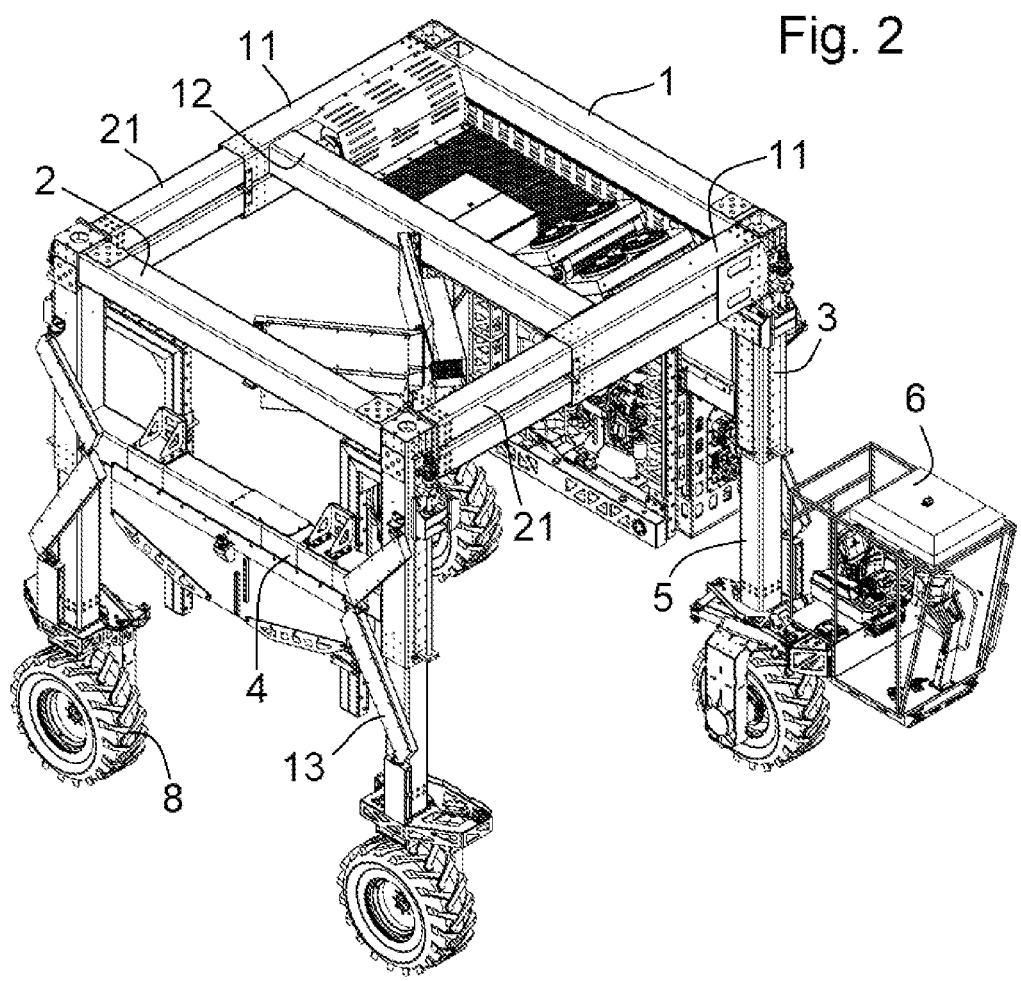
Figure 5:
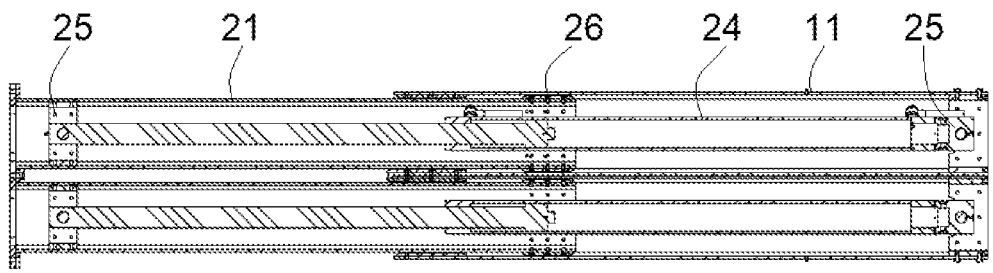
FIGS. 5 and 6 show one of the two assemblies that form the lateral movement of the machine. These assemblies are made up of welded telescopic tubes (11, 21) inside of which two double-acting cylinders (24) are located, similar to those of the vertical supports, which are fastened at the two points (25) thereof by parts screwed to the tubes (11, 21) and (22, 23), and enable the tubes (21, 23) to slide telescopically on the tubes (11, 22) from friction plates (26). These sets of tubes and cylinders are fastened to the structure from bolted plates.
Figure 6:
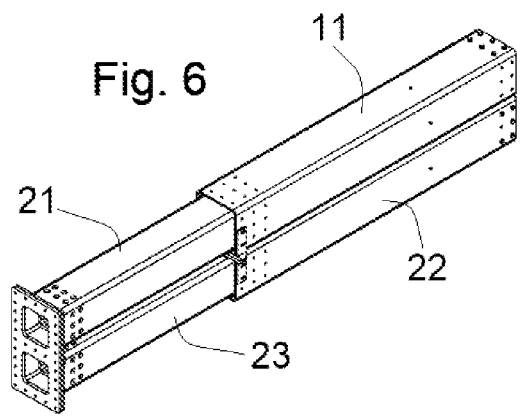

When the tractor is completely closed, the cabin and the motor must move and be located in the central portion of the structure. In this way, the vehicle complies with the maximum levels allowed to drive on public roads and the movement and rotation thereof are comfortable. When the tractor arrives at the farming business, it must be extended and lifted to adjust the internal dimensions thereof to the size of the trees to be worked. To do this, it has to move a few metres forward with the left and right wheels in reverse direction. As the machine advances, the lateral cylinders are activated and it opens sideways. For lifting, the height must be entered into the control and the machine, in a static position, is lifted. The automaton of the machine is in a closed loop with the current position at all times to prevent misalignment and possible loss of traction. FIGS. 1 and 2 show respective views of the machine closed and completely open on both shafts.

Another special feature of the invention is that the height thereof can also be easily varied, adopting a transport position in which it will have a height less than the maximum height that the legislation allows so that it can drive on public roads without a special permit, at a working height at which it is situated above the trees. For this purpose, each of the vertices of the upper frames (1, 2) has respective vertical supports (3) made up of a main tube in which a second telescopic tube (5) couples in the lower end of which a wheel (8) is mounted that is equipped with a drive motor (28) and independent guide means to each wheel.

Inside each of the vertical supports (3) and the corresponding telescopic tube (5) respective hydraulic cylinders (14) are arranged, the ends (15) of which are mounted in order to lift or lower the upper structure of the machine to adapt it to the height of the trees to be cultivated. The friction plates (16) of both telescopic tubes (3, 5) enable a smooth and precise sliding between them. Likewise, the friction bushings (19) enable the wheels to rotate.

According to a special feature of the invention, this machine has independent suspension means for each wheel, made up of the lifting cylinders (14) themselves that are located on the respective supports (3) of each machine wheel which, once in work position, adopt the damping function being able to contract or extend to absorb ground irregularities and automatically level the structure.

It should be noted that this machine also has an electronic control system, which includes slope sensors that detect when the machine tilts over a safety value so that said control system commands the lifting cylinders (14) so that it is automatically levelled. To adjust the height of each support and enable the wheels to be continuously in traction, this damping system absorbs any ground irregularities and ensures the efficiency and safety of the traction system due to hydraulic accumulators installed in each of the supports.

The structure of the machine is complemented by respective crossbeams (4) that link the lower ends of the vertical supports (3) by the two longitudinal sides of the machine, which make up structural and support means for the drive and control systems of the machine.

The motor (7) and certain components of the machine are mounted articulated in one of said lower crossbeams (4) in order to be able to adopt a working position in which they are located outside the structure of the machine, or a transport position in which they are located within the structure of the machine.

For the steering and driving of the machine there is a cabin (6), which is mounted on one of the vertical supports (3). This cabin can rotate and adopt at least two operating positions: a working position in which it is located outside the structure of the machine (see FIG. 2) without interfering with the passage thereof over the trees and in a retracted position (see FIG. 1) in which it is placed in an area close to the central portion of the structure of the machine and in the front portion thereof to be able to move on public roads.

The machine of the invention includes a diesel motor (7), the fuel of which is stored in tanks (9). This motor (7) moves a set of hydraulic pumps, which provide the oil pressure and flow rate required by the two independent hydraulic systems. The first system provides hydraulic power to the motors (28) of each wheel, responsible for the traction of the machine; while the second system provides power to the lifting (14) and opening (24) cylinders of the machine, to the supports of the accessories (31) and to the different pruning, fumigation or picking accessories installed in the machine.

The machine of the invention has electrical/electronic equipment (10) to control the equipment. Specifically, it includes an automaton that calculates the rotations of each wheel (8) and coordinates the position of the cylinders (18) so that it can perform the rotation correctly, maintaining the necessary parallelism both in a straight path and in a curve; likewise, each wheel has blocking means for blocking any of the rotation shafts of the wheels, so that they can adopt various operating modes:

when the machine is in road mode, only the front ones can rotate, however, when the machine is in the field, the rear wheels also include steering, and that even the wheels on the same shaft may lose the parallelism during the opening/closing of the machine.

As can be seen in several of the figures of the machine, in the vertical and horizontal extensions it has a guide means for guiding the hoses and wiring inside the structural tubes of the machine, formed from metal sheets that are cut, folded and mounted by way of a hinge (13).

Figure 7:
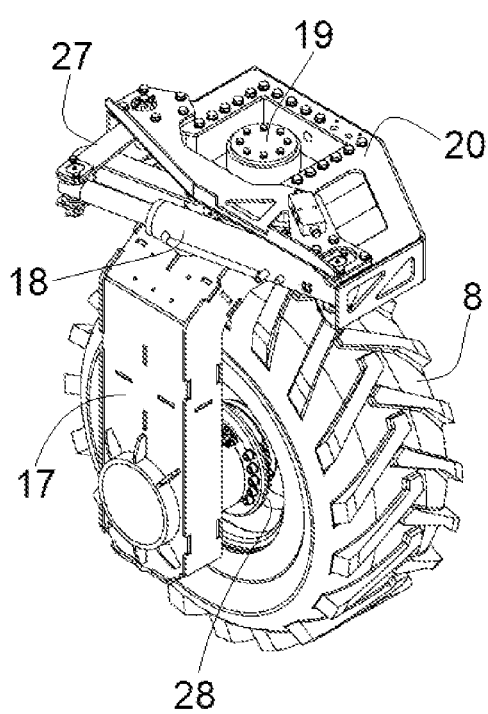
FIG. 7 shows the assembly of one of the drive and steering wheels (8).

FIG. 7 shows one of the wheels (8) of the machine, which incorporates an independent motor (28) on the shaft thereof, which enables the traction and braking of the machine from the hydraulic system. Each wheel is mounted on a support (17) that is coupled at the top through friction bushings (19) in the corresponding telescopic tube (5).

This transmission system of each wheel can be changeable depending on the ground on which it moves. By having measures for the autonomous movement thereof on public roads, the tractor can activate or deactivate the front shaft, depending on the traction it requires at any time to achieve maximum efficiency.

To manage the steering of each wheel (8) there is a double-acting hydraulic cylinder (18), coupled to a connecting rod system (27) in order to be able to rotate the wheel in both directions and at a wide rotation angle. This cylinder (18) drives the front connecting rods (27) and causes the wheel assembly to rotate on a bronze bushing located in the internal portion of the fixed telescopic structural tube. All four wheels are drive and steering wheels and can rotate both sides up to 45°. The hydraulic cylinders that perform the described rotation have an internal sensor that captures the position at all times such that the automaton of the machine closes the positioning loop and when a rotation of the machine is requested with the rotation of the steering wheel, the hydraulic system is activated until it reaches the point indicated on the electronic sensor.

Figure 8:
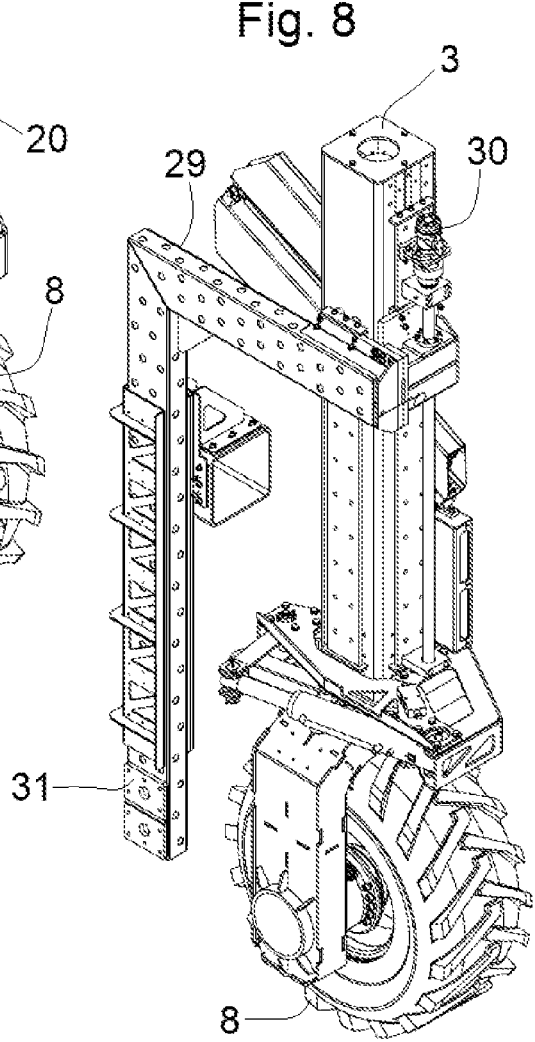
FIG. 8 shows one of the machine's accessory supports, fixed to one of the vertical supports (3). Each pruning, fumigating or picking accessory is anchored in these structural nodes (29) and are completely independent from the lateral and vertical opening movement of the machine. Each node has an independent hydraulic motor (30) that drives a spindle and is responsible for lifting or lowering the node (29). This structure has a lower support plate (31) to anchor the accessory, which also incorporates a reinforcement guide to prevent vibrations from the accessories from being transmitted to the main structure of the machine.

FIG. 8 shows supports for various accessories, located on the supports (3) of the machine, made up of structural nodes (29) in which the different work accessories for trees and bushes, such as pruning, fumigation or fruit picking systems are anchored, which have a drive means (30) to lift or lower the position thereof with respect to the structure of the machine, independently.

The invention claimed is:

1. A multipurpose machine for cultivating trees, which includes an inverted U-shaped structure that enables the machine to pass over existing trees to carry out pruning, disinfection or fruit picking tasks, provided at the bottom with wheels, driven by at least one motor that autonomously facilitates the movement thereof, the multipurpose machine comprising:

a first upper frame with a U-shape configuration, a core of said first upper frame makes up a first of longitudinal sides of the machine, while first wings thereof shape up front and rear sides of said structure, said first wings being formed by tubes that are open at a free end and attached at points close to ends thereof by a structural crossbar;

a second upper frame, with a U-shape configuration, facing that of the first frame, the core of said second upper frame makes up a second of the longitudinal sides of the machine, while second wings telescopically couple inside the first wings of the first frame;

first respective hydraulic cylinders, the ends of which are mounted inside the respective facing said first and second wings, with the driving of which moves a portion of the structure on a right is telescopically with respect to that on the left, varying the width of the machine;

respective vertical supports located in vertices of said first and second upper frames made up of a main tube in which a second telescopic tube couples in the lower end of which a wheel is mounted that is equipped with a drive motor and independent guide means for each wheel, wherein said first and second upper frames include said first frame and said second frame;

second respective hydraulic cylinders, the ends of which are mounted inside each of the vertical supports and the corresponding telescopic tube, in order to lift or lower the upper structure of the machine to adapt said second respective hydraulic cylinders to the height of the trees to be cultivated;

respective crossbeams that link the lower ends of the vertical supports by the two longitudinal sides of the machine, which make up structural and support means for the drive and control systems of the machine; and a cabin, mounted on one of the vertical supports, with the ability to rotate from a position in which said cabin is located outside the structure of the machine to another in which said cabin is placed in an area close to the central portion thereof.

2. The machine according to claim 1, further comprising:
independent suspension means for each wheel, made up of the lifting cylinders located on the respective supports of each machine wheel which, once in the working position, adopt the damping function, being able to contract or extend to absorb ground irregularities and automatically level the structure.

3. The machine according to claim 1, further comprising:
an electronic control system, which includes slope sensors that detect when the machine tilts above a safety value, so that said control system commands the lifting cylinders so that the machine is automatically levelled.

4. The machine according to claim 1, wherein
the first and second wings that form the front and rear sides of the machine structure have thereunder third and fourth wings welded to the previous ones, which in turn incorporate therein a hydraulic cylinder that collaborates in the telescopic movement of the portion of the structure on the right with respect to the one on the left, varying the width of the machine.

5. The machine according to claim 1, wherein
the motor and at least one of a plurality of components of the machine are mounted articulated in one of the lower crossbeams in order to be able to adopt a working position in which the motor and the at least one of a plurality of components are located outside the structure of the machine, or a transport position in which the motor and the at least one of a plurality of components are located within the structure of the machine.

6. The machine according to claim 1, further comprising:
a motor that moves a set of hydraulic pumps, which provide the oil pressure and flow rate required by two independent systems that provide hydraulic power to:
one of them, to the motors of each wheel, responsible for the traction of the machine, and
the other to the lifting and opening cylinders of the machine, to the accessory supports and to the different pruning, fumigation or picking accessories installed in the machine.

7. The machine according to claim 1, further comprising:
an automaton that calculates the rotations of each wheel and coordinates the position of the cylinders so that said automaton can perform the rotation correctly, maintaining the necessary parallelism both in straight and curved paths; likewise, each wheel has blocking means for blocking any of the rotation shafts of the wheels, so that said automaton can adopt various operating modes:
when the machine is in road mode, only the front ones can rotate, or
when the machine is in the field, the rear wheels also include steering, and that even the wheels on the same shaft may lose the parallelism during the opening/closing of the machine.

8. The machine according to claim 1, further comprising:
a guiding means for guiding the hoses and wiring inside the structural tubes of the machine and in the vertical and horizontal extensions made from metal sheets that are cut, folded and mounted by way of a hinge.

9. The machine according to claim 1, further comprising:
supports for various accessories, located on the supports of the machine, made up of structural nodes in which the pruning, fumigation or fruit picking systems are anchored, which have a drive means to lift or lower the position thereof with respect to the structure of the machine, independently.

10. A multipurpose machine for cultivating trees, which includes an inverted U-shaped structure that enables the machine to pass over existing trees to carry out pruning, disinfection or fruit picking tasks, provided at the bottom with wheels, driven by at least one motor that autonomously facilitates the movement thereof, the multipurpose machine comprising:
a first U-shaped upper frame having a first U-shaped upper frame core, the first U-shaped upper frame core makes up a first longitudinal side of the machine, while first wings thereof shape up a front side and a rear side of said inverted U-shaped structure, said first wings being formed by tubes that are open at a free end and attached at points close to ends thereof by a structural crossbar;
a second U-shaped upper frame facing that of the first U-shaped upper frame, the second U-shaped upper having a second U-shaped upper frame core, the second U-shaped upper frame core makes up a second longitudinal side of the machine, while second wings telescopically couple inside the first wings of the first U-shaped upper frame;
first respective hydraulic cylinders, wherein ends of said respective hydraulic cylinders are mounted inside the respective facing of said first and second wings, whereby the driving of said respective hydraulic cylinders moves a portion of the inverted U-shaped structure on a first side is telescopically with respect to that on a second side, varying the width of the machine;
respective vertical supports located in vertices of upper frames made up of a main tube in which a second telescopic tube couples in a lower end of which a wheel is mounted that is equipped with a drive motor and independent guide means for each wheel, wherein the upper frames include said first frame and said second frame;
second respective hydraulic cylinders, wherein ends of said second respective hydraulic cylinders are mounted inside each of the vertical supports and a corresponding telescopic tube, in order to lift or lower an upper structure of the machine;
respective crossbeams that link lower ends of the vertical supports by said first and second longitudinal sides of the machine, which make up structural and support means for the drive and control systems of the machine; and
a cabin, mounted on one of the vertical supports, with the ability to rotate from a first position in which said cabin is located outside the structure of the machine to a second position.

* * * * *